United States Patent
Ledet

(10) Patent No.: US 11,227,495 B1
(45) Date of Patent: *Jan. 18, 2022

(54) MOBILE DEVICE TRANSPORT PARKING NOTIFICATION AND MOVEMENT TRACKING

(71) Applicant: OPEN INVENTION NETWORK LLC, Durham, NC (US)

(72) Inventor: David Gerard Ledet, Allen, TX (US)

(73) Assignee: OPEN INVENTION NETWORK LLC, Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/903,317

(22) Filed: Jun. 16, 2020

Related U.S. Application Data

(63) Continuation of application No. 15/894,395, filed on Feb. 12, 2018, now Pat. No. 10,685,568, which is a continuation of application No. 15/589,284, filed on May 8, 2017, now Pat. No. 9,892,642.

(51) Int. Cl.
| | | |
|---|---|---|
| H04W 4/23 | (2018.01) | |
| G08G 1/14 | (2006.01) | |
| H04W 68/00 | (2009.01) | |
| H04W 4/02 | (2018.01) | |

(52) U.S. Cl.
CPC ............ *G08G 1/144* (2013.01); *H04W 4/023* (2013.01); *H04W 4/027* (2013.01); *H04W 68/005* (2013.01)

(58) Field of Classification Search
CPC ...... G08G 1/144; H04W 4/023; H04W 4/027; H04W 68/005; G06F 3/011; G06F 3/00; G06F 3/01; G06F 3/012; G06F 3/013; G06F 3/014; G06F 3/015; G06F 1/163; G06F 3/03545; G06F 3/0488; G02B 27/017; G02B 27/0172; G02B 2027/0138; G02B 2027/014; G02B 2027/0187
See application file for complete search history.

(56) References Cited

U.S. PATENT DOCUMENTS

| | | |
|---|---|---|
| 7,643,935 B2 | 1/2010 | Sakakibara et al. |
| 8,880,288 B2 | 11/2014 | Li et al. |
| 8,994,560 B2 | 3/2015 | Anderson et al. |
| 9,047,765 B2 * | 6/2015 | Sutardja ........... G08G 1/096775 |
| 9,481,368 B2 | 11/2016 | Tomozawa et al. |
| 9,566,877 B2 | 2/2017 | Kriger |

(Continued)

OTHER PUBLICATIONS

Andrienko et al., Scalable Analysis of Movement Data for Extracting and Exploring Significant Places (Year: 2013).

(Continued)

*Primary Examiner* — Hai Phan
*Assistant Examiner* — Anthony D Afrifa-Kyei

(57) ABSTRACT

Tracking movements of mobile devices may provide insight into parking space availability for transports deemed to be associated with those mobile devices. One example method of operation may include identifying a transport speed of a particular transport vehicle is moving above a first threshold speed, identifying a first change in direction of the transport and confirming a new transport speed after the first change in direction is less than a second threshold speed. The method may also include initiating a monitoring event to track movement of the transport responsive to the first change in direction of the transport or the confirmed new transport speed.

20 Claims, 14 Drawing Sheets

(56) References Cited

U.S. PATENT DOCUMENTS

| | | |
|---|---|---|
| 9,704,392 B2 | 7/2017 | Wang |
| 9,812,015 B1 | 11/2017 | Cox et al. |
| 9,854,086 B1 | 12/2017 | McSchooler |
| 9,892,642 B1 | 2/2018 | Ledet |
| 9,969,386 B1 | 5/2018 | Wang et al. |
| 10,403,144 B1 | 9/2019 | Ledet |
| 10,793,190 B2 | 10/2020 | Iwami et al. |
| 2002/0169552 A1 | 11/2002 | Hashida |
| 2005/0137766 A1 | 6/2005 | Miyakoshi et al. |
| 2006/0113119 A1 | 6/2006 | Dudeck et al. |
| 2007/0005225 A1* | 1/2007 | Sutardja .......... G08G 1/14 701/117 |
| 2007/0005228 A1 | 1/2007 | Sutardja |
| 2007/0146164 A1 | 6/2007 | Schmid et al. |
| 2008/0009990 A1 | 1/2008 | Katoh et al. |
| 2009/0259365 A1 | 10/2009 | Rohlfs et al. |
| 2010/0049402 A1 | 2/2010 | Tanaka |
| 2010/0060486 A1 | 3/2010 | Nakashima et al. |
| 2010/0066515 A1 | 3/2010 | Shimazaki et al. |
| 2010/0070138 A1 | 3/2010 | Schoening et al. |
| 2010/0089677 A1 | 4/2010 | Tanaka et al. |
| 2010/0265103 A1 | 10/2010 | Barth et al. |
| 2011/0037621 A1 | 2/2011 | Fujiwara et al. |
| 2011/0054739 A1 | 3/2011 | Bammert et al. |
| 2011/0077853 A1 | 3/2011 | Ranford et al. |
| 2011/0140922 A1 | 6/2011 | Levy et al. |
| 2011/0241898 A1 | 10/2011 | Busch |
| 2011/0273310 A1 | 11/2011 | Kadowaki et al. |
| 2012/0013485 A1 | 1/2012 | Pampus et al. |
| 2012/0056758 A1 | 3/2012 | Kuhlman et al. |
| 2012/0136997 A1 | 5/2012 | Yan et al. |
| 2012/0143456 A1 | 6/2012 | Ueda et al. |
| 2012/0200430 A1 | 8/2012 | Spahl |
| 2012/0256434 A1 | 10/2012 | Roberts et al. |
| 2012/0256766 A1 | 10/2012 | Lavoie |
| 2012/0265434 A1 | 10/2012 | Woodard et al. |
| 2012/0299749 A1 | 11/2012 | Xiao et al. |
| 2013/0057686 A1 | 3/2013 | Genc et al. |
| 2013/0110342 A1 | 5/2013 | Wuttke et al. |
| 2013/0120161 A1 | 5/2013 | Wakabayashi et al. |
| 2014/0156183 A1 | 6/2014 | Windeler et al. |
| 2014/0257943 A1* | 9/2014 | Nerayoff .......... H04N 5/23296 705/13 |
| 2015/0344028 A1 | 12/2015 | Gieseke et al. |
| 2016/0046285 A1 | 2/2016 | Kim et al. |
| 2016/0068158 A1 | 3/2016 | Elwart et al. |
| 2016/0142880 A1 | 5/2016 | Talluri et al. |
| 2016/0144857 A1 | 5/2016 | Ohshima |
| 2016/0205238 A1 | 7/2016 | Abramson et al. |
| 2016/0284217 A1 | 9/2016 | Lee et al. |
| 2017/0018183 A1 | 1/2017 | Rosen et al. |
| 2017/0025009 A1 | 1/2017 | Hakeem et al. |
| 2017/0148324 A1 | 5/2017 | High et al. |
| 2017/0154474 A1 | 6/2017 | Bae et al. |
| 2017/0206473 A1 | 7/2017 | Dermosessian |
| 2017/0229017 A1 | 8/2017 | Bartsch |
| 2017/0248440 A1 | 8/2017 | Nishimura |
| 2017/0320399 A1 | 11/2017 | Yuan |
| 2018/0162446 A1 | 6/2018 | Mikuriya et al. |
| 2018/0279068 A1 | 9/2018 | Yamashiro et al. |
| 2018/0304885 A1 | 10/2018 | Kang et al. |
| 2018/0308359 A1 | 10/2018 | Hayakawa |
| 2020/0310445 A1 | 10/2020 | Noguchi et al. |

OTHER PUBLICATIONS

Ferreira et al., Mobile Device Sensing System for Urban Goods Distribution Logistics (Year: 2017).

Li et al., A Parking Algorithm for Parking Assist System (Year: 2011).

Xia et al., Using Smart Phone Sensors to Detect Transportation Modes (Year: 2014).

* cited by examiner

MOBILE DEVICE TRANSPORT PARKING NOTIFICATION AND MOVEMENT TRACKING

TECHNICAL FIELD OF THE APPLICATION

This application relates to a mobile application for parking a transport and more particularly to tracking transport movement and identifying parking areas which are available for a particular transport based on known location information.

BACKGROUND OF THE APPLICATION

Conventional transport parking efforts are based on a first come first serve basis. More advanced techniques utilize car counting procedures which match a number of parking spots to a number of transport sensor triggers which detect a number of transport vehicles entering a parking area and/or leaving a parking area. Those techniques are not precise and fail to identify when oversized vehicles may take more than one parking space. Also, the sensors and display devices intended to notify transport operators (users) are costly and can be damaged over time.

Modern technology has succeeded in identifying locations of mobile devices and other communicative devices which can access base stations and global positioning platforms (GPS). Such data can be used to identify locations and even exact movements of mobile devices which are often carried by users operating transports such as cars, motorbikes, trucks, boats, planes, etc. This information can assist users with identifying potential open spaces in areas frequented by the users operating the transports.

SUMMARY OF THE APPLICATION

One example embodiment may provide a method that includes at least one of identifying a transport speed is moving above a first threshold speed, identifying a first change in direction of the transport, confirming a new transport speed after the first change in direction is less than a second threshold speed, and initiating a monitoring event to track movement of the transport responsive to at least one of the first change in direction of the transport and the confirmed new transport speed.

Another example embodiment may include an apparatus that includes a processor configured to identify a transport speed is moving above a first threshold speed, identify a first change in direction of the transport, confirm a new transport speed after the first change in direction is less than a second threshold speed, and initiate a monitor event to track movement of the transport responsive to at least one of the first change in direction of the transport and the confirmed new transport speed.

Still another example embodiment may include a non-transitory computer readable storage medium configured to store instructions that when executed causes a processor to perform identifying a transport speed is moving above a first threshold speed, identifying a first change in direction of the transport, confirming a new transport speed after the first change in direction is less than a second threshold speed, and initiating a monitoring event to track movement of the transport responsive to at least one of the first change in direction of the transport and the confirmed new transport speed.

Still yet a further example embodiment may include a method that provides tracking movements of mobile devices within a predefined geographical area, identifying a first movement of a first mobile device as being limited to a predetermined threshold distance, identifying a second movement of the first mobile device as having a movement speed that is greater than a movement speed of the first movement, and designating the mobile device as being inside a transport leaving a parking spot.

Still another example embodiment includes an apparatus that includes a processor configured to track movements of mobile devices within a predefined geographical area, identify a first movement of a first mobile device as being limited to a predetermined threshold distance, identify a second movement of the first mobile device as having a movement speed that is greater than a movement speed of the first movement, and designate the mobile device as being inside a transport leaving a parking spot.

Still yet another example embodiment may include a non-transitory computer readable storage medium configured to store instructions that when executed causes a processor to perform tracking movements of mobile devices within a predefined geographical area, identifying a first movement of a first mobile device as being limited to a predetermined threshold distance, identifying a second movement of the first mobile device as having a movement speed that is greater than a movement speed of the first movement, and designating the mobile device as being inside a transport leaving a parking spot.

DETAILED DESCRIPTION OF THE APPLICATION

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

Figure 1:
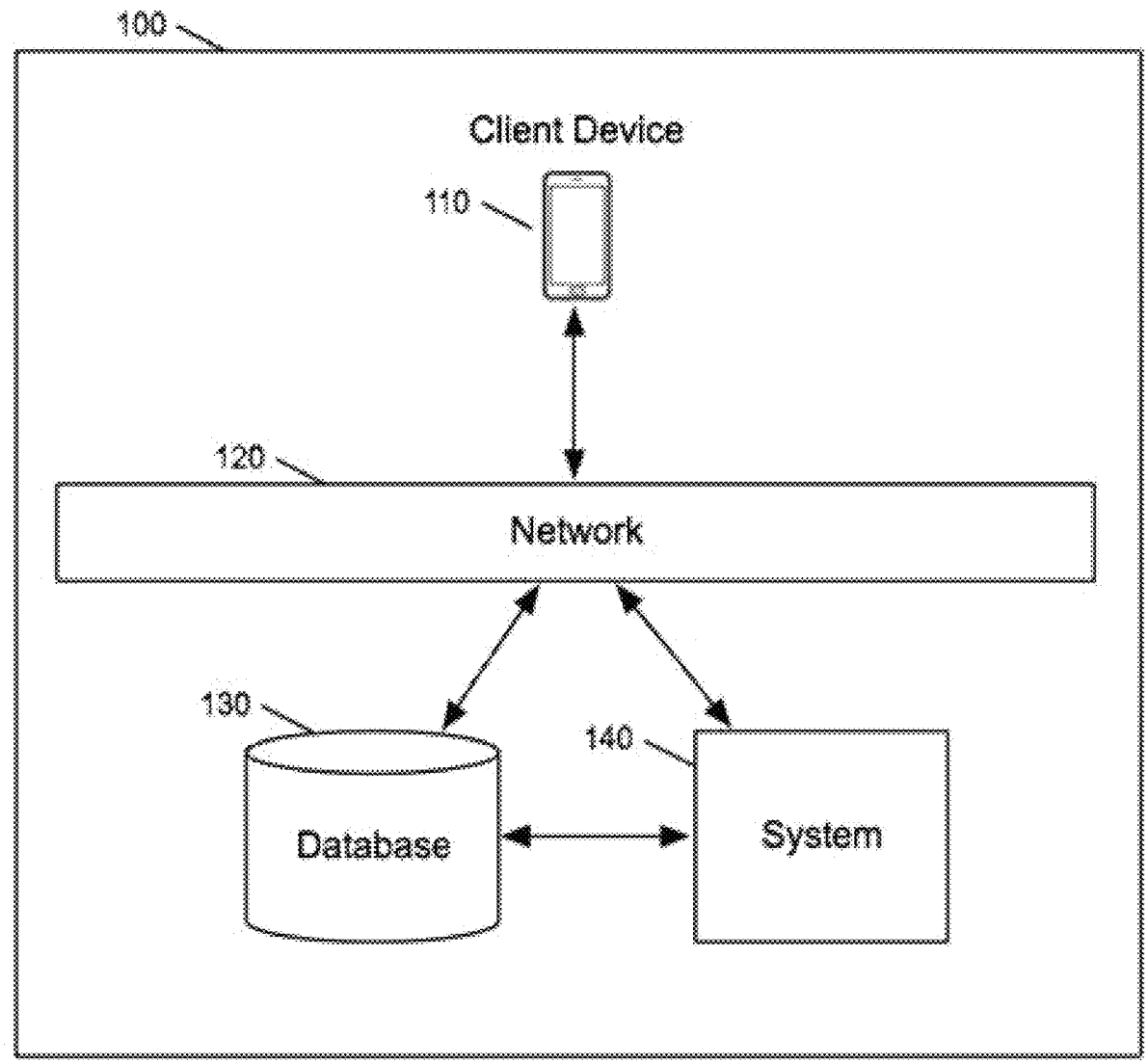
FIG. 1 illustrates a system diagram of a client device operating in a network configuration according to example embodiments.

FIG. 1 illustrates a system diagram of a client device operating in a network configuration according to example embodiments. Referring to FIG. 1, the configuration 100 of the current application determines when the user of the application performs movements that reflect either the parking of a vehicle, or the leaving of an open space, such as a parking space or area, through the geographic movements of the user's mobile device.

Certain embodiments permit the determination of a parking of a transport vehicle through the examination of the movement of a client device 110. Through the examination of particular movements or analysis of the device data, such as through the device's location data, it is possible to determine that the transport has parked in an available or open spot and/or vacated a parking space in a particular geographical area. Certain states are presented in the current application such that the transport is either in a parked state or a non-parked state so that when the transport moves from one state to another, a parking space either has become 'available' or is presently identified as 'taken'. In another example, the notification of an available parking space is sent to devices operated by users based on their current geographical location with respect to the identified space and/or their current traveling direction, speed, maneuvering or other known attributes of the transport location and activities conducted.

In FIG. 1, a network diagram 100 of the present application includes various devices, such as a client device 110, a network 120, such as the Internet, a database of information 130 and a system 140 representing a server or other remote processing entity. A user utilizing a mobile client device 110 may include one of a mobile device, tablet computer, a laptop or desktop computer, a wearable device, a gaming system, a DVD player or other media player, or any other device containing a processor and memory. The software of the current application may be included in a default client device or may be downloaded from a remote source, for example the system 140. The present application in the form of software, for example, may alternately reside on the client's device 110 that may be any of a mobile laptop device and/or a personal desktop computer or a mobile device. The computing device is connected to the network 120, which may be the Internet or any other type of network through wired or wireless communication. It should be noted that other types of devices, in addition to devices 110, might be used with the present application. For example, a PDA, an MP3 player or any other wireless device, a gaming device (such as a hand held system or home based system) and the like (including a P.C. or other wired device) that can transmit and receive information may be used with the present application.

The user of the application may operate with the client device 110 and connect through the network 120 to the system 140 to receive and process data. Additional processing is performed by the system 140, such as processing that is specified to a user account and/or global to all users in the environment. An environment may include a designated geographical area, such as a radius of a known location including but not limited to a shopping mall, a commuter lot, a local monument, a city block, etc. Processing that is specific to a single user may be performed in the client device and processing that is more global in nature (i.e. for more than a single user) may be performed in the system 140. The system 140 may be a server or any other computer containing a processor and a memory. The system 140 may be redundant, or be more than a single entity without deviating from the scope of the application. A database 130 is directly connected to the system 140 or connected remotely through the network without deviating from the scope of the application.

The current application resides either completely or partially on the client device 110, which may be a mobile device, but may also reside on a user's desktop computer, a personal digital assistant (PDA), tablet computer, or any other device containing a processor, memory, and functional software such as an operating system. In addition, the current application may reside either completely or partially on any one of the other elements in the system 140 depicted in FIG. 1, for example, the database 130, and/or the network 120 or cloud network. In the event that the current application resides on a device, the application is downloaded through a platform, such as an application store or market residing on the device or accessed via the device, or may be accessed through the device's browser communicably coupled to the network 120. Further, the application may be pre-loaded on the device or automatically loaded based on the location of the device, attributes of the user and/or of the device. The current application may work with any device, such as a personal computer, a laptop, a personal computing tablet, a smartphone, a PDA, a watch, glasses or any device with a processor and memory.

Figure 2:
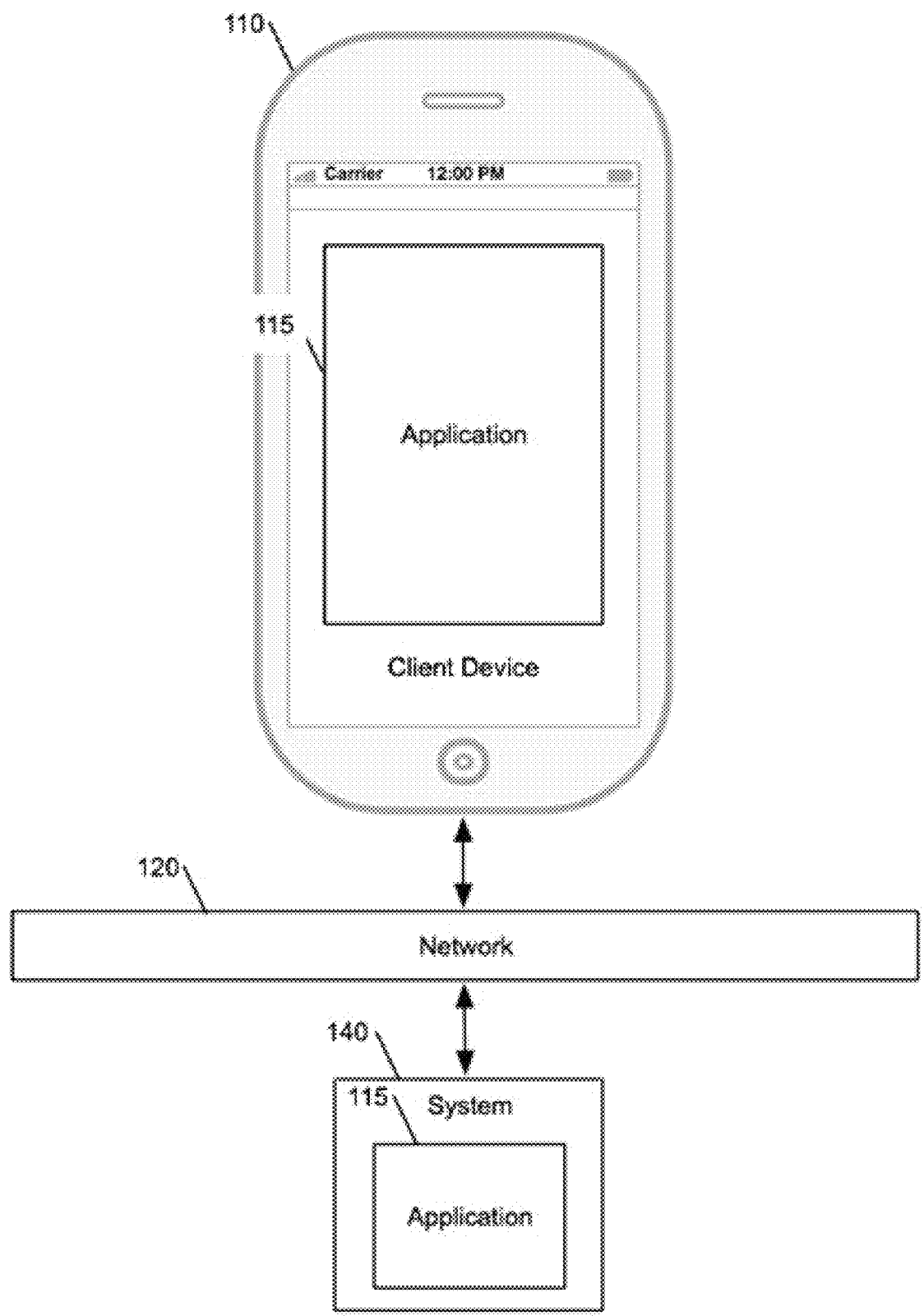
FIG. 2 illustrates an application layer of a system diagram for a client device according to example embodiments.

FIG. 2 illustrates an application layer of a system diagram for a client device according to example embodiments. FIG. 2 is a system diagram depicting the possible locations of the application in one implementation of the current application. The application of the 115 is software that may reside entirely in the client device 110, entirely in the system 140, or partially in both. In other embodiments, the application 115 may also reside in whole or partially in the network 120, the database 130, or in any other element outside of the stated entities wherein messaging between the client device and the system 140 occurs through the network 120. The application executing on the client device 110 may interact with the system 140 via messaging routed through the network 120. The current application 115 determines whether the user is parking a vehicle or moving from a parking situation by analysis of data. Through the analysis of data, for example, GPS data, it is possible to determine the movement of the transport at a detailed level.

For example, in the GOOGLE environment, the application is connected to a location service via the GOOGLE application programming interface (API) client and then location updates can be requested. By interfacing with the location object, it is possible to obtain the last known location of the device providing a base from which to start tracking movements and location points. This ensures that the application has a known location before starting the periodic location updates. The last known location is obtained by calling a method on the location object (i.e. getLastKnownLocation( )). Once the last location is known, then deltas between the current location and the last location are possible to calculate and maintain via an updated procedure.

Some of the data that may be present in the location object includes a location of the device, a particular latitude and longitude, a horizontal direction of travel, an altitude and/or the velocity of the device, etc. Such data, such as the location object data may be integrated within the transport itself. The GOOGLE API permits for obtaining location-based data. For example, the following is a list of the possible types of data and functions that can access the data including but not limited to a 'Location Manager Class' that provides access to the system location services. Such services permit applications to obtain periodic updates of the device's geographical location, or to fire an application-specified intent when the device enters the proximity of a given geographical location. Another class may include 'LocationManager.requestLocationUpdates( )' to register for location updates. The location class 'A' data class represents a geographic location. A location can include latitude, longitude, timestamp, and other information such as bearing, altitude and velocity. Another class may include 'Location.getSpeed( )' which obtains the speed if available, which can be returned in meters per second over ground. Still other classes may include 'Location.getLongitude( )' to obtain the longitude in degrees. Additional classes may include 'Location.getLatitude( )' to obtain the latitude in degrees, 'Location.getLastKnownLocation( )' which returns a location indicating the data from the last known location fix obtained from the given provider.

Through interactions with location service function calls, such as 'getLastKnownLocation( )', the current application may determine the user of the device may be parking a transport when the device performs at least one of the following operations including but not limited to determining the device either the client device or the device integrated in the transport is moving at a certain velocity, the device moves in a turn similar to a 180-degree arc indicating the transport is making a U-turn on a street, and travels in an exact or approximate straight line in a particular direction, the device stops and begins to move in a reverse motion for a small amount of space, for example 15-20 yards prior to stopping again, the device stops and moves in an opposite direction of the previous motion for a small amount of space, for example, 2-5 yards. In addition to the above-noted maneuvers and actions, when a user makes a sharp turn, for example, a 90 degree turn or similar turn into a parking spot and stops the transport, it is assumed that the transport is moving into a parking spot. For example, when the user pulls into a grocery store parking spot or other type of parking lot.

Figure 3:
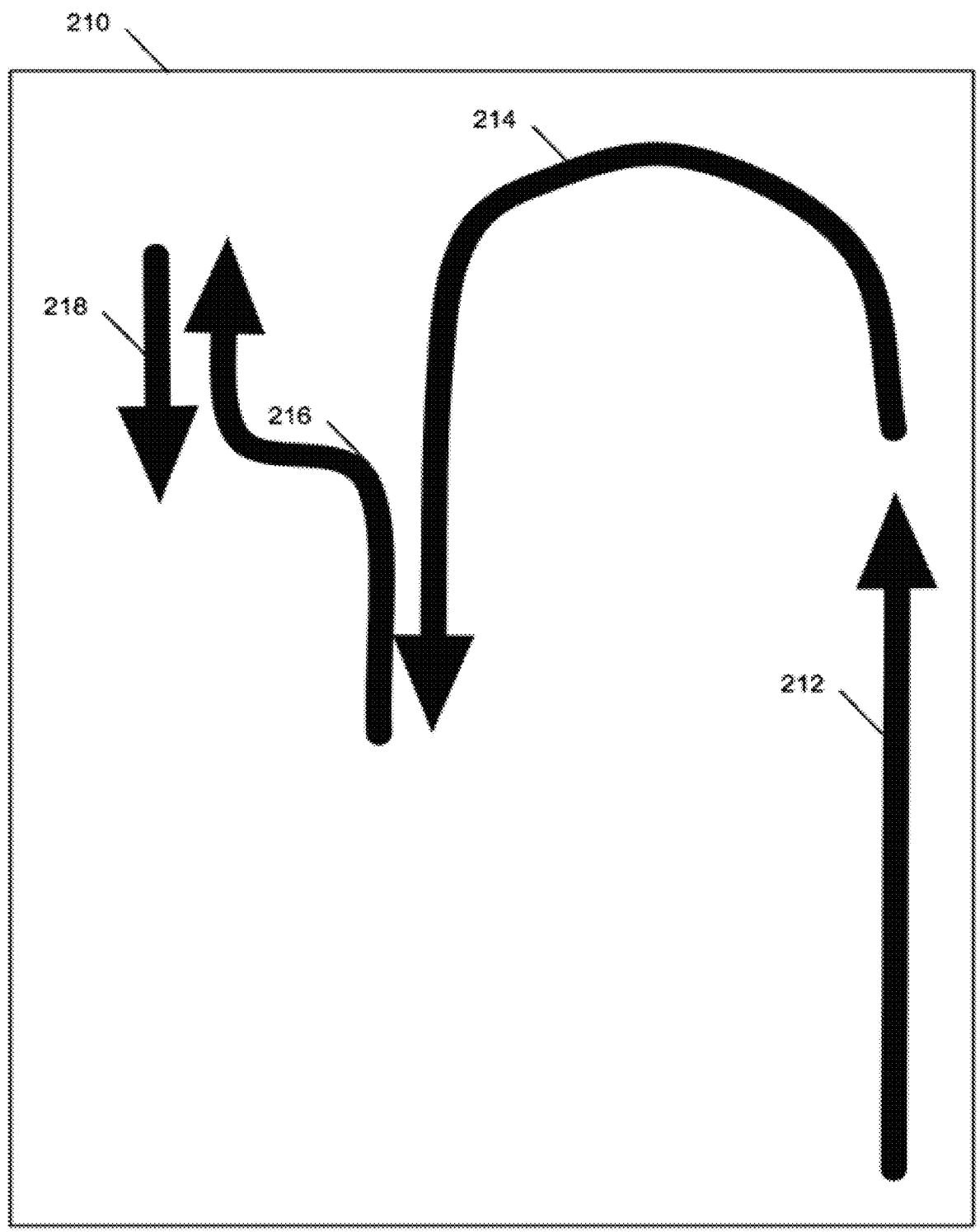
FIG. 3 illustrates a movement tracking map of movements performed by a transport which are tracked by a client device according to example embodiments.

FIG. 3 illustrates a movement tracking map of movements performed by a transport to enter a parking spot, which are tracked by a client device according to example embodiments. Referring to FIG. 3, one specific example of transport movement 210 is illustrated in as including movement of a transport so that the user makes a U-turn on a road then parallel parks in a parking spot. The transport may move in a straight or semi-straight direction 212. The transport may then proceed to engage a 180-degree turn potentially on the road 214 and the transport is then moving in the opposite or semi-opposite direction. The transport then moves in an opposite direction 216 with a potential small turn or turns such that this third movement is smaller in distance than the previous indicating a mere adjustment of position after locating a parking spot. Finally, the transport moves in an opposite direction for even a smaller distance 218 than the previous movement indicating a finalization movement/adjustment. This movement may indicate the parking of a transport for example a transport moving in a sequence to indicate a parallel parking effort. When the above condition (s) is/are met, it is determined that the transport has been parked and the geographic parking space where the transport has parked is no longer available and should be included on a parking map for a particular geographical area shared with all users utilizing the parking application for that geographical area. The application may also determine that when the user moves from the parking spot, thus making the parking spot available.

In another scenario, when the user's client device reflects a movement similar to the following example, it is assumed that the user has moved from a parking spot or has left a parking spot behind and has moved into the road ahead. In this movement scenario, the movement of the device reflects a movement of a small distance for example 10-15 yards reflective of a transport backing from a parking spot. The speed of the movement indicates a slow motion (i.e. below 10 miles per hour or a comparable movement speed threshold). The client device moves in a relatively straight line reflective of the transport traveling on a road. The speed of the movement indicates a moving transport (i.e. above 10 miles per hour) traveling down a road which is indicative no parking effort is being made at such a time.

Figure 4:
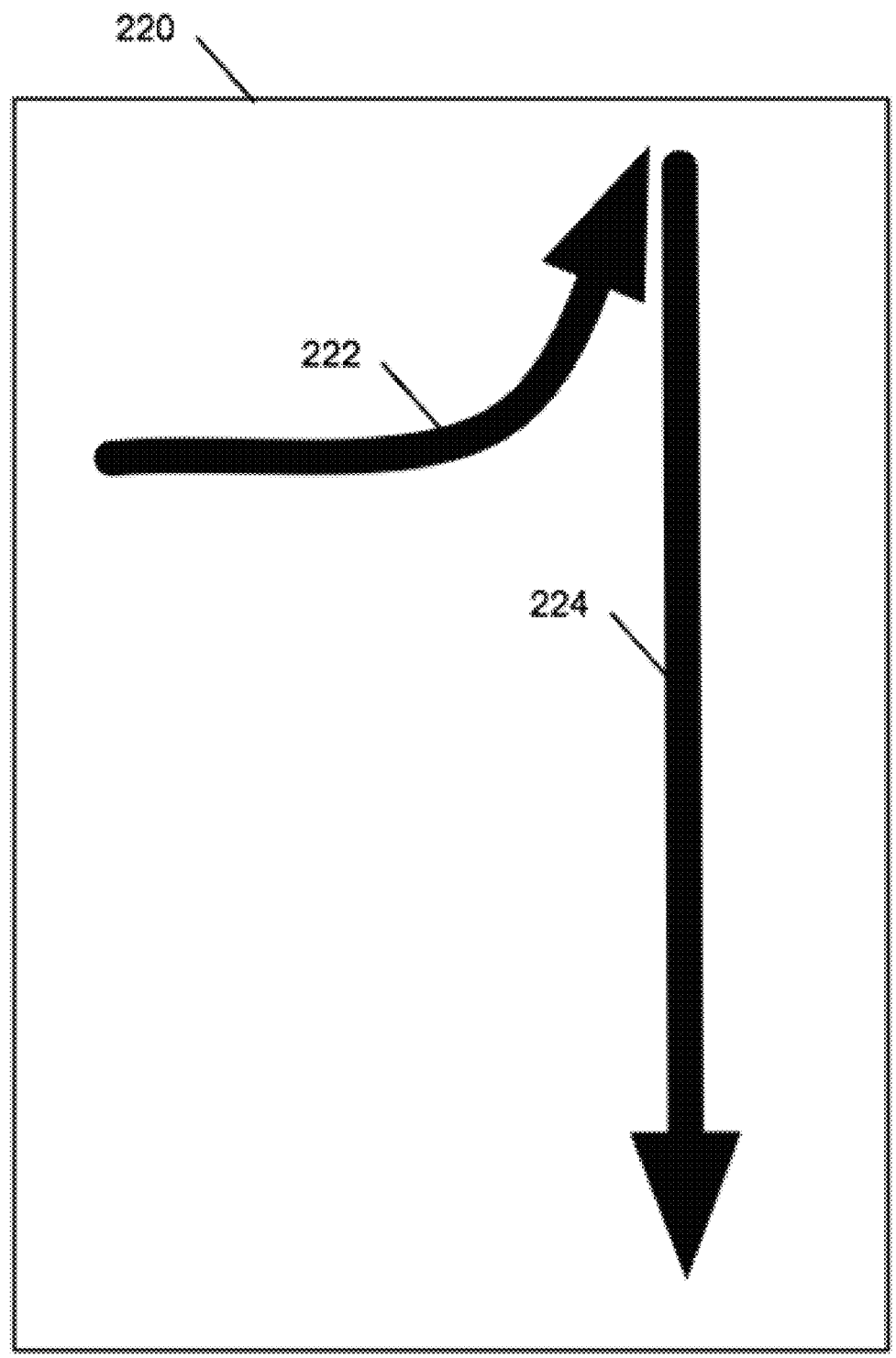
FIG. 4 illustrates another movement tracking map of movements performed by a transport vacating a parking space which are tracked by a client device according to example embodiments.

FIG. 4 illustrates another movement tracking map of movements performed by a transport vacating a parking space which are tracked by a client device according to example embodiments. Referring to FIG. 4, a possible movement when a transport is vacating a parking space 220 includes certain movements, and it is understood that the diagram depicts one possible movement sequence and many other movements may be determined indicating the vacating of a parking space of a transport. In this example, the transport movement 220 includes a move in a direction that is similar to a small distance, such as 10-15 yards 222. There may be a curving of the path of movement. The transport then moves in a different direction in a straight or semi-straight line 224.

The software of the current application 115 contains a portion or module permitting the configuration of data for the application. The application may contain a navigation menu, for example, a menu GUI component where portions of the application are selected. Different portions of the application may be navigated via the navigation menu. In one embodiment, a configuration module is available via the navigation menu where data may be configured.

Figure 5:
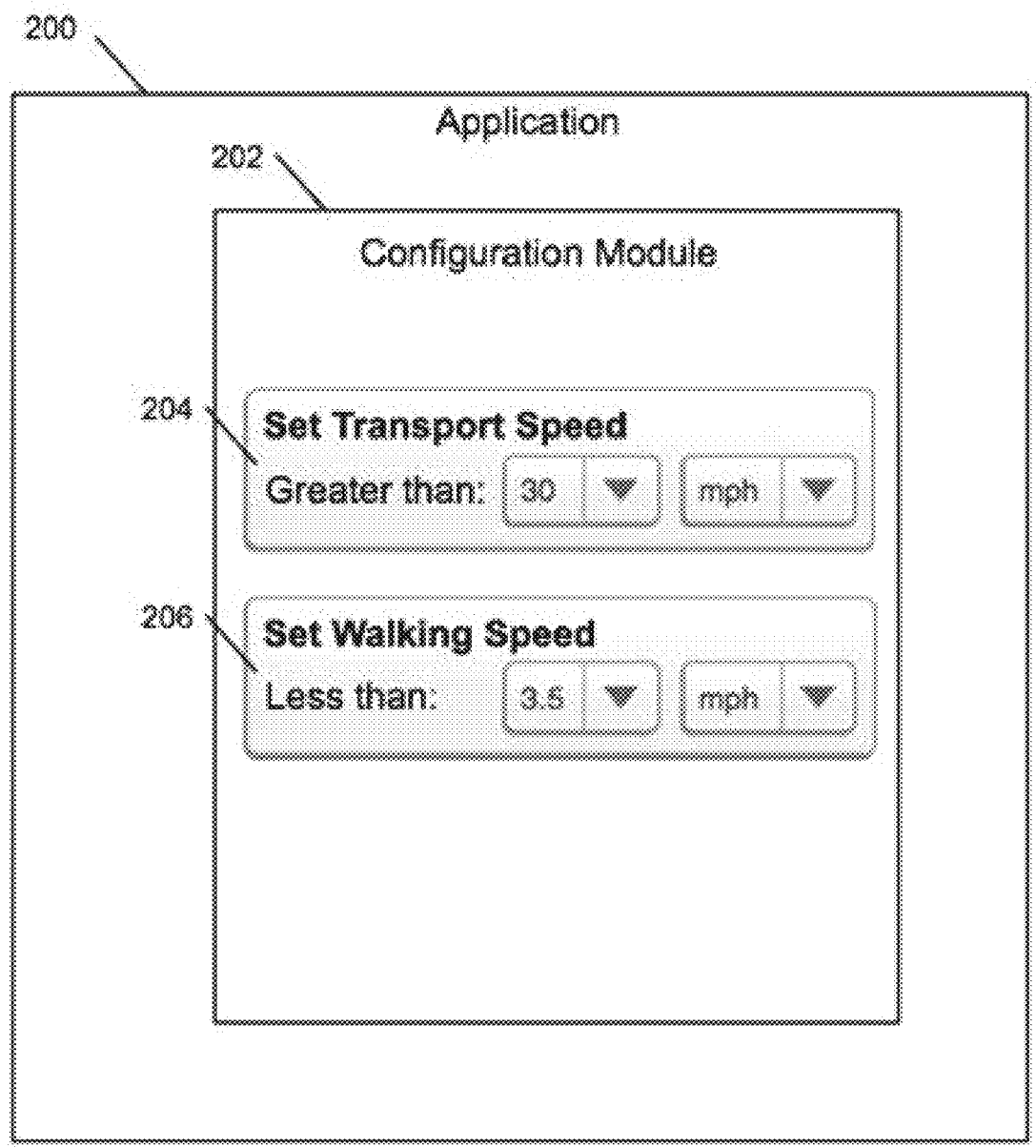
FIG. 5 illustrates an application for initiating a speed monitoring procedure of a client device according to example embodiments.

An example of a GUI of the configuration module is depicted in FIG. 5. Referring to FIG. 5, it should be understood that the elements in the depicted example illustrate possible configuration elements. Other configuration elements such as the geographic location of the user, the normal commute or traveling habits of the user may be added and depicted as configuration elements which may be added/removed in the implementation of the current application without deviating from the scope of the current application. The configuration module 202 executing in the current application 200 executes on the client device 110. The GUI window 202 is a snapshot of the configuration window depicting two configurable elements including transport speed 204 and walking speed 206.

The first interface element 204 permits the user to select the speed of the transport so when the user's device is moving at that speed or greater than that threshold speed, the device is considered to be in a moving transport. The user is able to select a speed via a dropdown component defaulted to "30" and the unit of measure is also defaulted to "mph" or miles per hour. Other units available will be "km/h"—kilometers per hour, or "fps"—feet per second. The second element 206 permits the walking speed to be determined. If the device is traveling below this speed for a set time (not depicted), then it is determined that the device is not in a transport.

In another example, the application executing in the client device 110 and/or the system 140 automatically determines the elements set in the configuration module by receiving data from the system 140. The application at the client device communicates with the system 140 via messaging routed through the network 120 and the system 140 sends the data of the elements in the configuration module. This data may be common data among many or all of the users in the system 140 and may be resident in the system 140 or obtained via messaging with a database 130.

Figure 6:
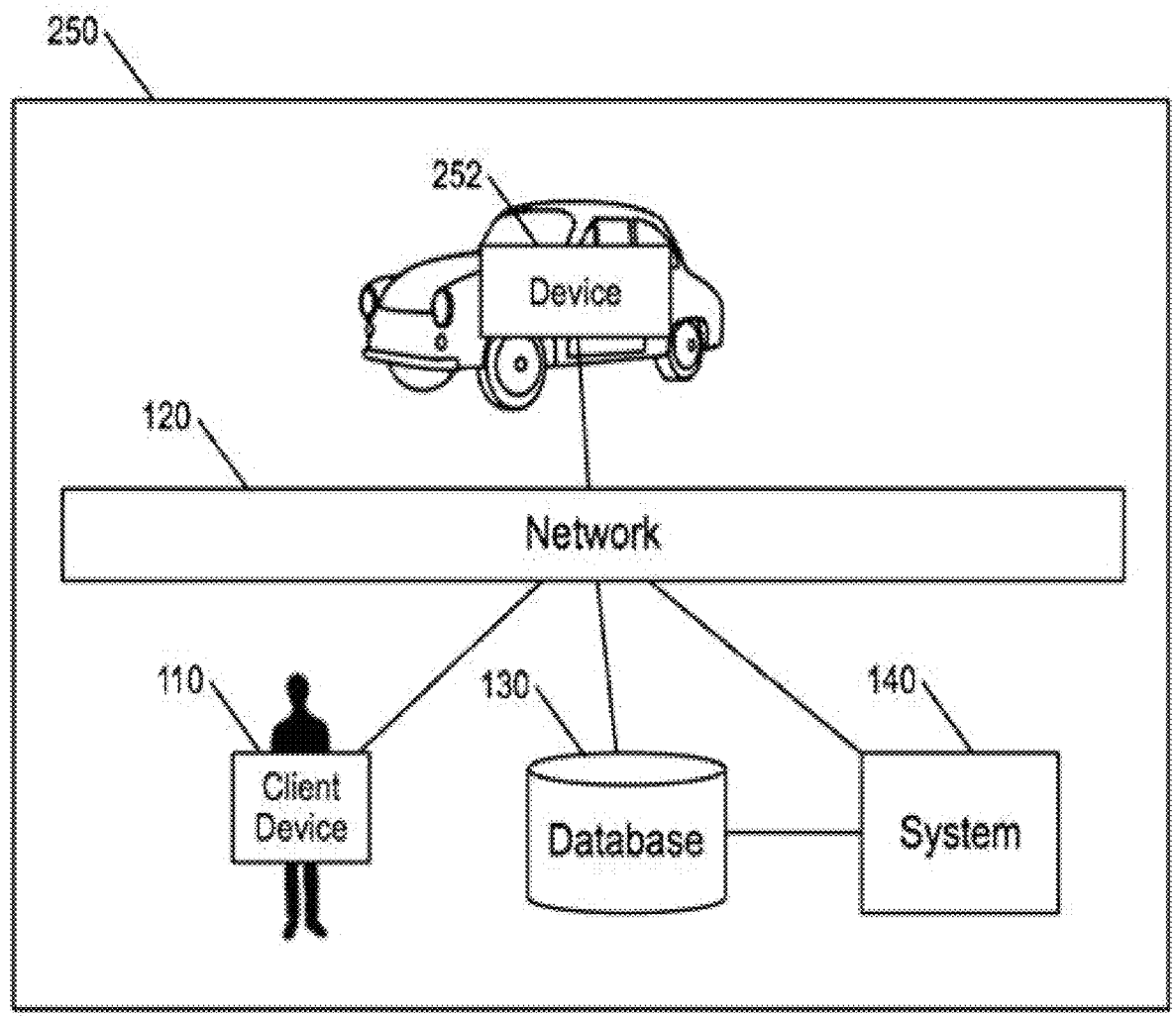
FIG. 6 illustrates a device transport configuration network according to example embodiments.

FIG. 6 illustrates a device transport configuration network according to example embodiments. Referring to FIG. 6, a network diagram 250 illustrates an alternate embodiment of the current application where the device is part of the transport 250 and is not specific to a client device. In this example, a device 252 is part of the transport, such as a 4G/WIFI/LTE compatible device which may be part of the OBDII port of the transport and which is capable of receiving GPS signals and collecting GPS, location, speed, and other data to share with the system 140. The device 252 may be integrated, attached or connected to the transport. The device obtains the movement of the transport and communicates with the user's client device 110 and/or the system 140 through the network 120. The system 140 may be communicably coupled with a database 130, or communicate remotely with the database 130 through the network 120.

The functionality of the current application 115 is distributed in one or more existing transport devices so the device is part of the transport and/or devices 252. For example, the transport may be one or more of a motorcycle, an electric or hybrid vehicle, a recreational vehicle (RV), or similar transports. The device being part of the transport obtains data from the transport permitting the device to determine and record the transport movements, current speed, direction, etc. This data may be received from a connection to the transport's GPS device or other device that is part of the transport. The current application may then communicate directly with the device that is part of the transport.

The communication between the device in the transport and the client device may occur through the system 140 so that location data is transmitted to the system 140, then to the client device 110. The location data (i.e. current location, current speed, change in location, etc.) is sent to the system 140 at predetermined times, for example, every minute, X number of times per hour, etc. The current application performs processing to determine when a transport is in a parked state. In this calculation, the application may determine when a transport has occupied a parking spot, and therefore may be able to determine when the same parking sport is vacated.

Figure 7:
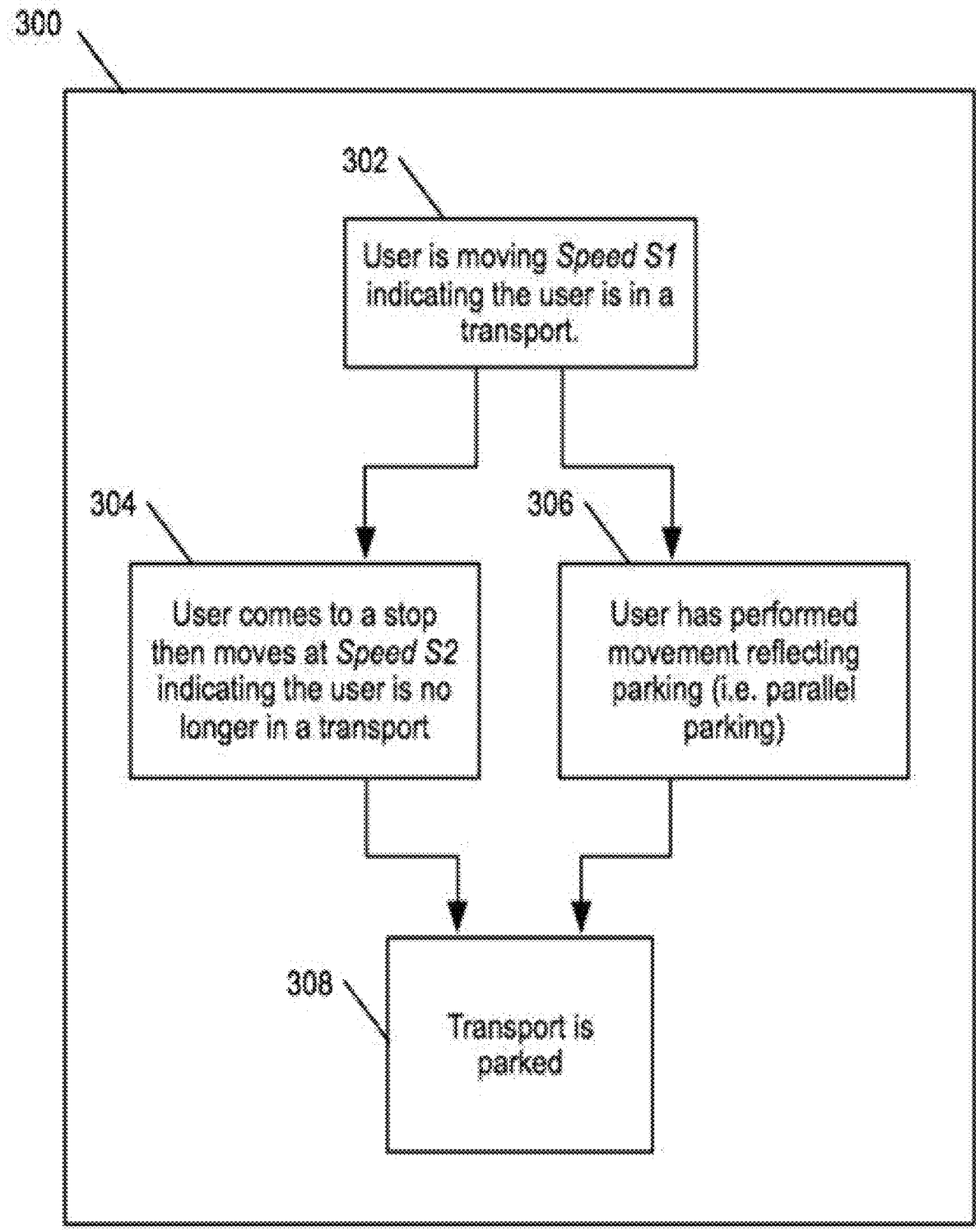
FIG. 7 illustrates a flow diagram of a speed monitoring procedure and parking determination according to example embodiments.

FIG. 7 illustrates a flow diagram of a speed monitoring procedure and parking determination according to example embodiments. In this example, determining when a parking spot is occupied 300. To determine if a transport has occupied a parking space, it is first necessary to determine that a user is in a transport that is not parked. If the user is moving at a particular speed 'S1' MPH, then it can be assumed that the user is in a transport 302. While it is impossible to ascertain the type of transport in which the user is traveling, it is still possible to determine that the user is traveling in a transport based on speed and location.

In one example, speed 'S1' is defined in the software (hardcoded) so the value is in the software and is static in nature and cannot be configured by the user. In another embodiment, the speed 'S1' may be defined by the configuration module of the software 204. There are two actions that may occur to determine that a transport has parked and occupied a parking space 304 and 306. The first action 304 utilizes similar functionality that is currently available via operating systems in mobile devices, such as "GOOGLE NOW" functionality. This functionality utilizes the device's sensors (i.e., the gyroscope and accelerometer) to determine when the user device exits a transport. The current application performs processing to determine when a transport is in a parked state. In this calculation, the application may determine when a transport has occupied a parking spot, and therefore may be able to determine when the parking spot is vacated. In either of the above scenarios, if the processing indicates that the transport is parked in a parking spot, the transport is moved to a parked state 308 in the current application.

Figure 8:
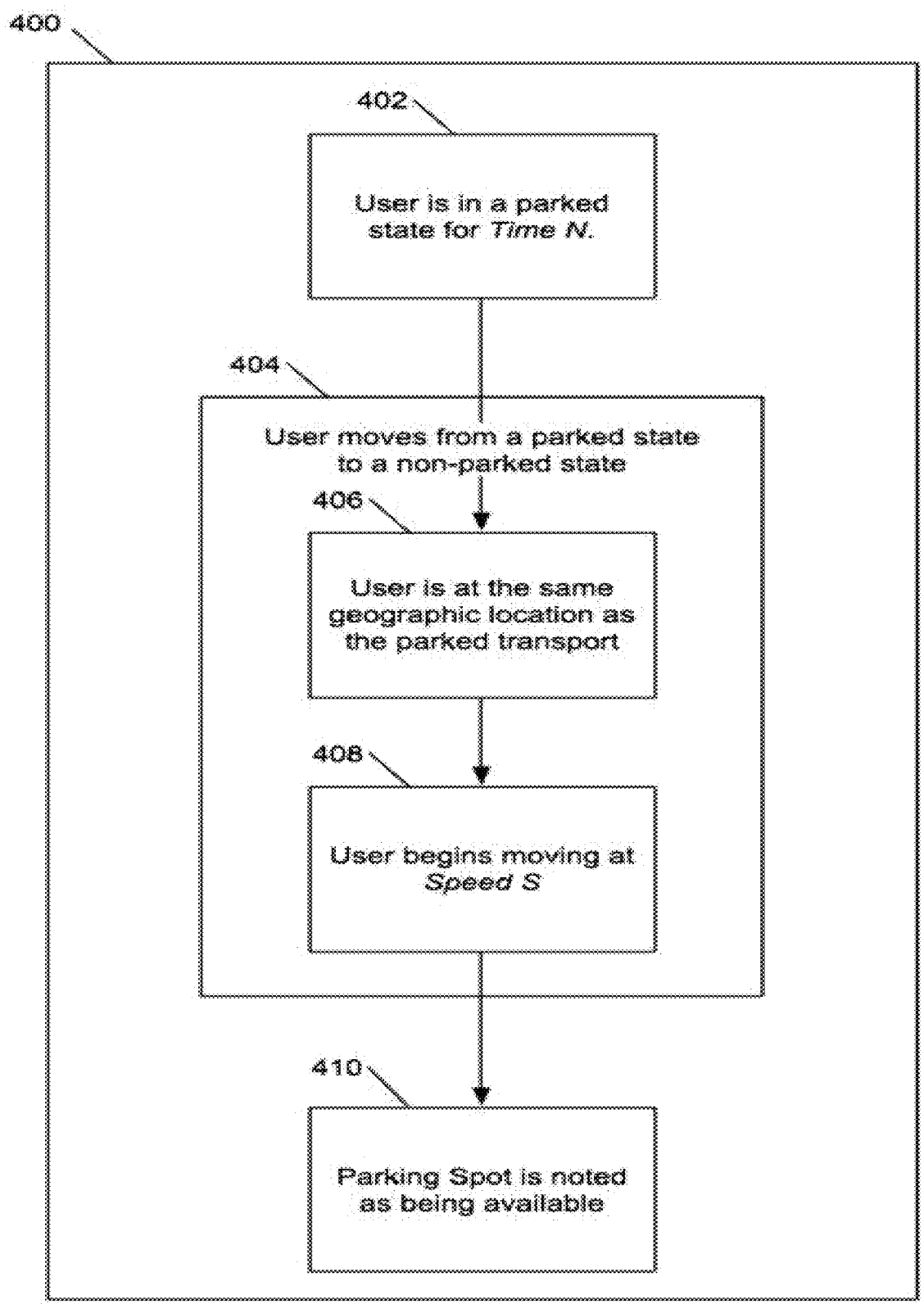
FIG. 8 illustrates a flow diagram of a speed monitoring procedure and parking availability determination according to example embodiments.

FIG. 8 illustrates a flow diagram 400 of a speed monitoring procedure and parking availability determination according to example embodiments. Referring to FIG. 8, determining when a parking spot becomes available can be performed by the current application by processing which performs various data operations to determine when the parking spot becomes available. There are many considerations when determining if a transport is in a parked state 402 including how the determination was made and how long the transport is present in the parked state. The processing permits a parking spot to be made available 404. When a user is at the location of a previously determined parking location of a transport 406, it is understood that the device may be in the transport.

Continuing with the same example, the transport begins to move at speed 'S' 408 where speed 'S' is the speed at which the application determines is the speed of a non-parked transport. Once this movement trigger occurs, it is assumed that the transport has moved from the parking spot and therefore the parking spot has become available 410. The transport may have an attached device or the user may have a client device 110 in the transport such that the current application interacts with the device to determine the movement of the device and the transport.

Figure 9:
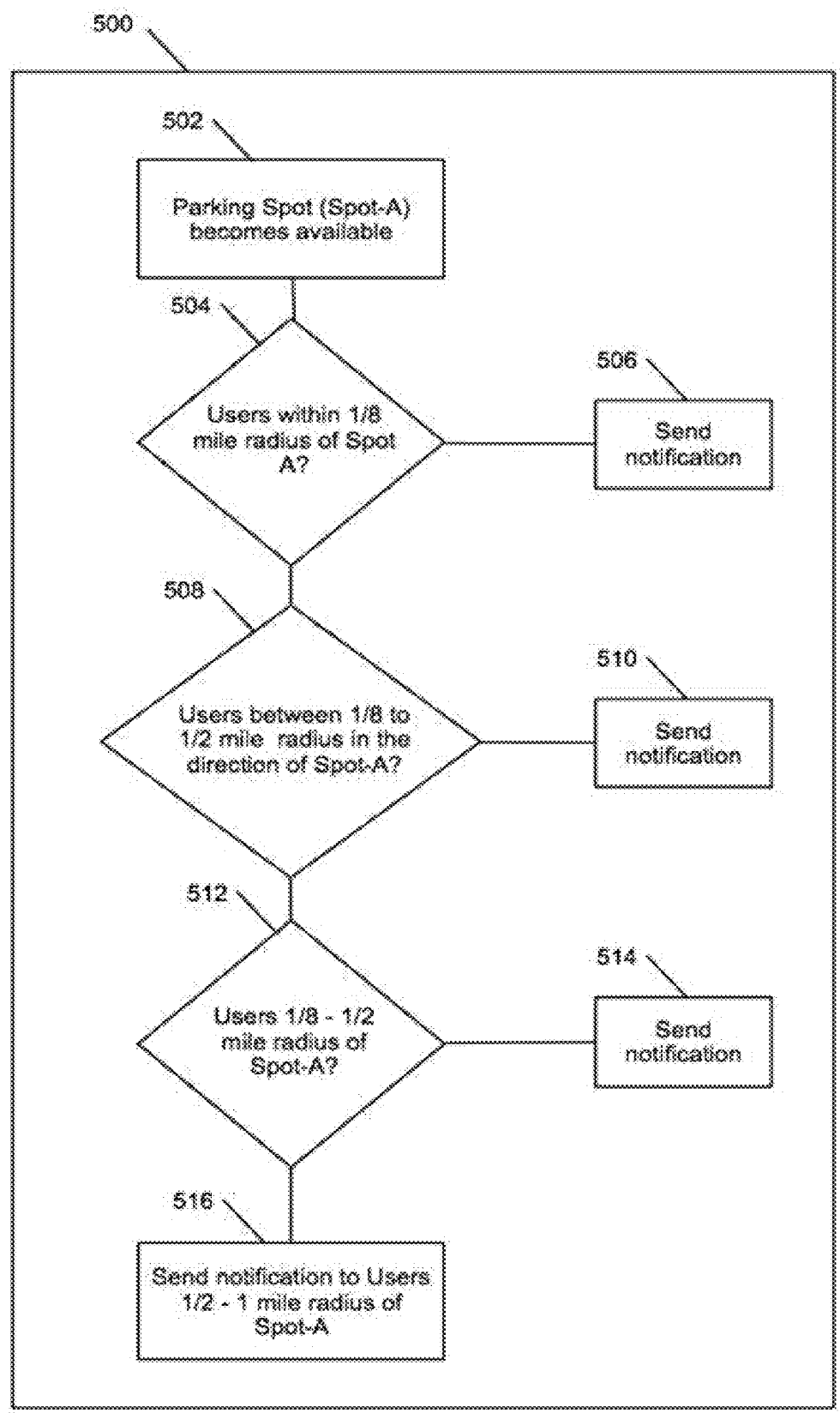
FIG. 9 illustrates a flow diagram of a parking notification procedure according to example embodiments.

FIG. 9 illustrates a flow diagram of a parking notification procedure according to example embodiments. Referring to FIG. 9, a message flow of one implementation of the current application 500 includes processing of notifications sent to other users of an available parking spot. In one embodiment, users that are subscribed to the application data are sent notifications only if it is determined that they are in a transport and whether they have an interest in the area being processed for parking potential. A user device may be identified to be in a transport once that user has exceeded speed 'S', which is the speed that the user's device is currently or recently traveling. Speed 'S' may be defined as a speed equal or greater to a determined transport speed as either software-defined in the application, or defined in the configuration module of the application.

In operation, as a parking spot (Spot-A) becomes available 502 and the current application determines that a parking spot is available, the application first attempts to locate any users within a predetermined radius (i.e., ⅛-mile) radius of Spot-A 504. Any user devices located in a ⅛-mile radius of the parking spot will automatically be sent a notification of the available Spot-A 506. Therefore, if the user is traveling in a transport, a notification will be sent indicating an available parking space. The user may wish to ignore the notification in the case where a parking space is not desired, or may act on the notification. Next, users outside of the initial ⅛-mile radius currently traveling in the geographic direction of Spot-A 508 are also sent the notification 510. Current application programming interfaces (APIs) permit a programmer to ascertain the direction of travel of a device. Next, users between ⅛ and ½ mile radius of the parking spot 512 are sent the notification 514 regardless of their direction of travel. Finally, users between ½ and 1 mile radius of the parking spot may also be sent the notification 516.

Determining a parking replacement with object detection is a necessary determination to identify a replacement vehicle for the parking space that is becoming available. In addition to vehicle space identification procedures disclosed, the use of any available video may be utilized to help determine if a vehicle is intending to occupy the space as an added procedure for additional assurance. To determine whether another transport will park in the space currently being vacated, specific functionality may be performed. For instance, the application may be able to utilize video data from the user's rear and/or front bumper, or any other video available to determine whether another vehicle will occupy the space therefore marking the parking space as available based on the added measure of identifying the space.

To perform this functionality, object detection is performed on the video captured by the front, rear, and/or other cameras on the transport. Object detection of the video attempts to examine any vehicle in the camera(s) view as the user's transport moves away from the parking space. This functionality is performed on the captured video from the transport's cameras (i.e. backup cameras, front fender cameras and the like). Communication between the device (either the client device 110 or a device attached to the transport) and the vehicle's video recording system occurs such that the device obtains access to the video feed, such as a live feed, or recorded video if the transport's system records the video. The application seeks to examine the video feed from the transport as the transport is exiting out of the parking space.

The video feed may be examined to determine whether the proximity of another transport in relation to the user's transport as it exits the space, also whether the other transport has a blinker activate such that the blinker reflects the same direction of the parking space. Object detection is used to determine objects in a video. Object detection is a computer technology related to computer vision and image processing that deals with detecting instances of semantic objects of a certain class, such as humans, buildings, or cars in digital images and videos. The use of object detection permits the current software to determine a transport that may be nearby when the user's transport is leaving a parking space.

The use of shape-based object detection may be utilized to determine a transport near the user's transport when leaving a parking spot. Shape-based object detection usually requires that a video be examined as a sequence of different images so each image may need to be pre-processed. Different object types such as various objects including but not limited to persons, flowers, and airplanes may require different algorithms. For more complex scenes, noise removal and transformations invariant to scale and rotation may be needed. Once the object is detected and located, edge detection and boundary-following procedures can identify boundaries. Once a shape has been detected, then the analysis of the video specifically concentrating on the shape to determine if a transport light blinker is operating is also possible. This may help to determine whether another transport is waiting to occupy the parking space.

Figure 10:
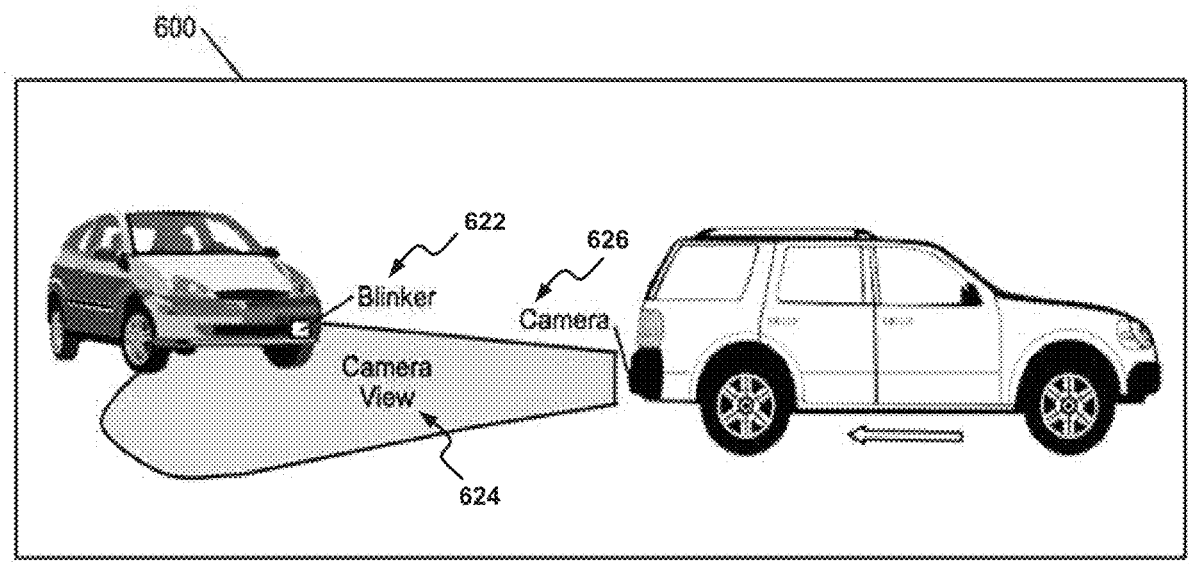
FIG. 10 illustrates a transport vacating scenario according to example embodiments.

FIG. 10 illustrates a transport vacating scenario according to example embodiments. Referring to FIG. 10, when detecting a transport while vacating a parking spot, the example illustrates the use of object detection in one embodiment of the current application 600. The transport's rear camera 626 detects another transport via the camera's view angle 624. Object detection is used to analyze the video recorded by the camera 626. Current software in the transport device or client device performs the analysis. Further analysis of the video determines that the blinker 622 of the other transport as a blinker on such that the blinker reflects that the transport may be interested in pulling into the vacated parking spot. As a result, the device monitoring the transport may forward a non-available space since there is another transport that most probably will occupy the space based on the blinker detection, the other transport detection, the location of the other transport and other data identified.

Figure 11:
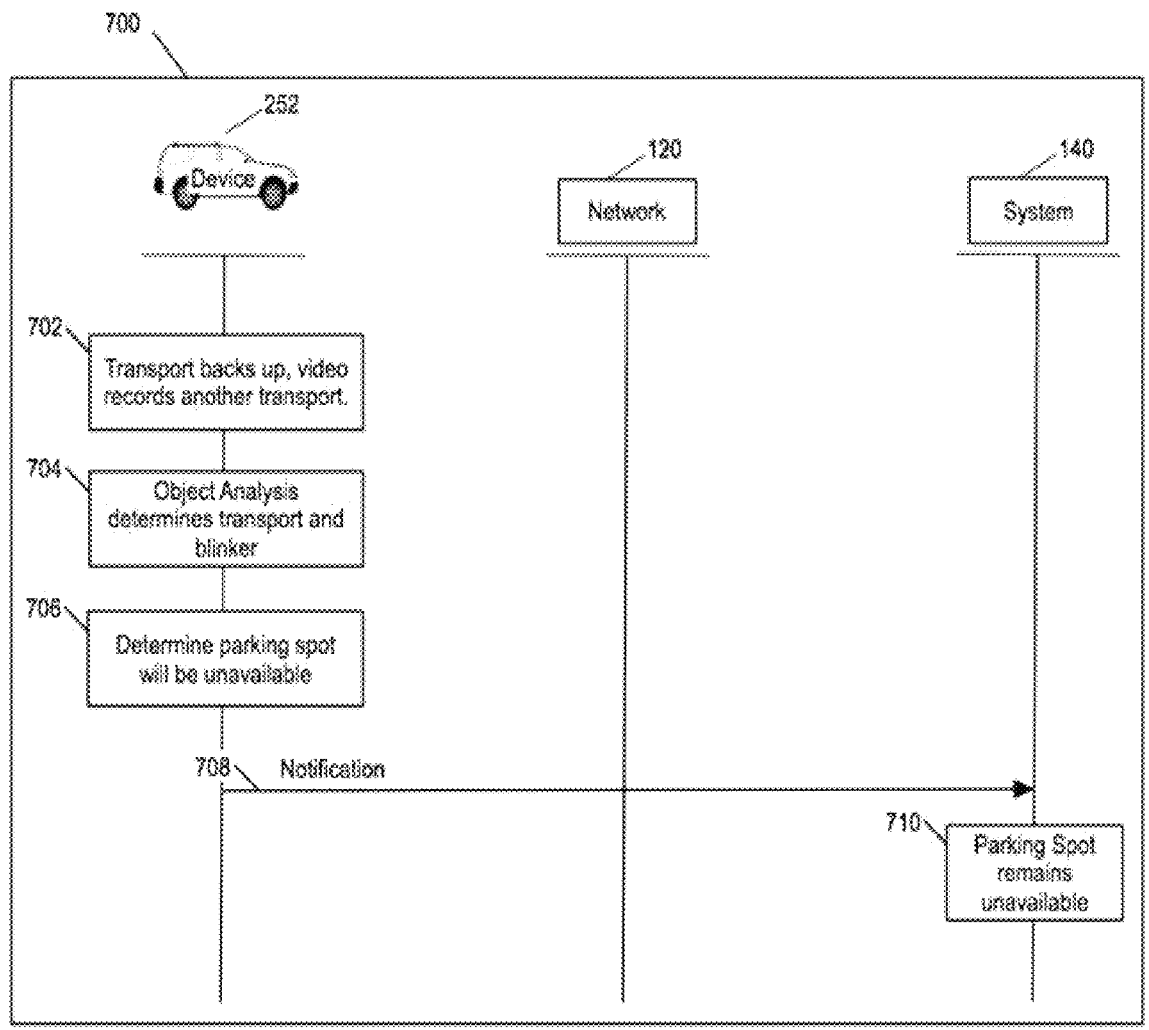
FIG. 11 illustrates a system configuration and flow diagram of managing parking availability according to example embodiments.

FIG. 11 illustrates a system configuration and flow diagram of managing parking availability according to example embodiments. Referring to FIG. 11, notifying a replacement transport is likely to occupy the parking spot that recently became available may include various operations and procedures. For example, a message diagram 700 includes the device 252 which is part of the transport in this embodiment, and which communicates with the transport by obtaining video captured on the transport's one or more video cameras. As the transport exits out of the parking space, the rear video camera captures a transport behind the parking space 702. Object analysis of the video is performed by the device 252 which identifies the transport behind the parking spot, further analysis determines the blinker that is flashing on the transport reflects that the transport may occupy the vacating parking space 704. The device determines that the transport behind the parking space will occupy the vacating space of the original transport and notifies the system 706.

A notification message 708 is sent to the system 140, and is routed through the network 120. The notification message data contains coordinate data pertaining to the current parking space (i.e. longitude and latitude), a reoccupy bit that when set indicates that the space will be reoccupied as well as other necessary or optional data. The notification message sends the coordinates of the current transport, and sets the reoccupy bit to true. The system 140 receives the notification message and obtains the received data. The parking spot is not marked as available causing no notifications to be sent to other users 710 due to the new transport identification.

According to one example embodiment, a user may be a member of a local community college, and shop at TARGET and at the local mall, and subscribe to parking for those areas and may also want to know when those areas have parking available/not available. The information may be provided via an alert to the registered use mobile device and application notification, etc. The information may include how many spaces have opened at any given time, seven days a week, at the previously visited stores or pre-registered stores and Monday through Friday for the community college. The user may automatically register by recent visits being logged by mobile device tracking functions (i.e., GPS) which are used to trigger a recurring update, or at least a prompt to have the user accept the recurring updates.

In another example, the current application is expanded to permit a user to be notified of available parking in multiple areas. The application may be used to monitor the multiple areas where notifications, such as the notification message 708, are received by the application for indicating parking spaces that have been vacated, or are currently vacated. The application tracks the parking spaces for parking spaces within an area. For example, there are two areas currently monitored by the application, such as area 'A' and area B'. The application receives notifications from transports vacating the parking spaces as those spaces become available. The application can then track the parking spaces within each area and share the information. In another example, the application stores the current status of the parking spaces in a coupled database 130 where communication may occur with a database and the system 140, and/or the network 120.

The current application contains a map of the areas including, for example, area A and area B, indicating the current status of the parking spaces. The map details the parking spaces with an indication of the spaces that are monitored via the current application. For example, a red circle icon is placed over the parking space that is occupied, a yellow circle icon is placed over the parking space that is not monitored via the application since the current status is unknown, and a green circle icon is placed over the parking space that has been vacated. This map is made available to a device upon request. In one example, the map is accessed via the client device 110 via communication between the client device and the system 140 through the network 120. For example, HTML-5 coding may be utilized to deliver and send the current map to the device from the system. The current application executing on the client device 110 displays the map and the user is able to obtain the status' of parking spaces in the area(s).

The current application executing on the client device 110 is able to query the system 140 to obtain details of the parking history at the areas. The history of the parking spaces in the area(s) are calculated by the system, as the system is aware of the parking status' of the spaces in the areas. The application may obtain a snapshot at a determined interval of the status' of the available parking spaces in the area(s) and records the number of free spaces at the time. This value is stored in the database 130. The database may then be queried by the client device 110, to determine the usual number of free spaces available at a given time.

Figure 12:
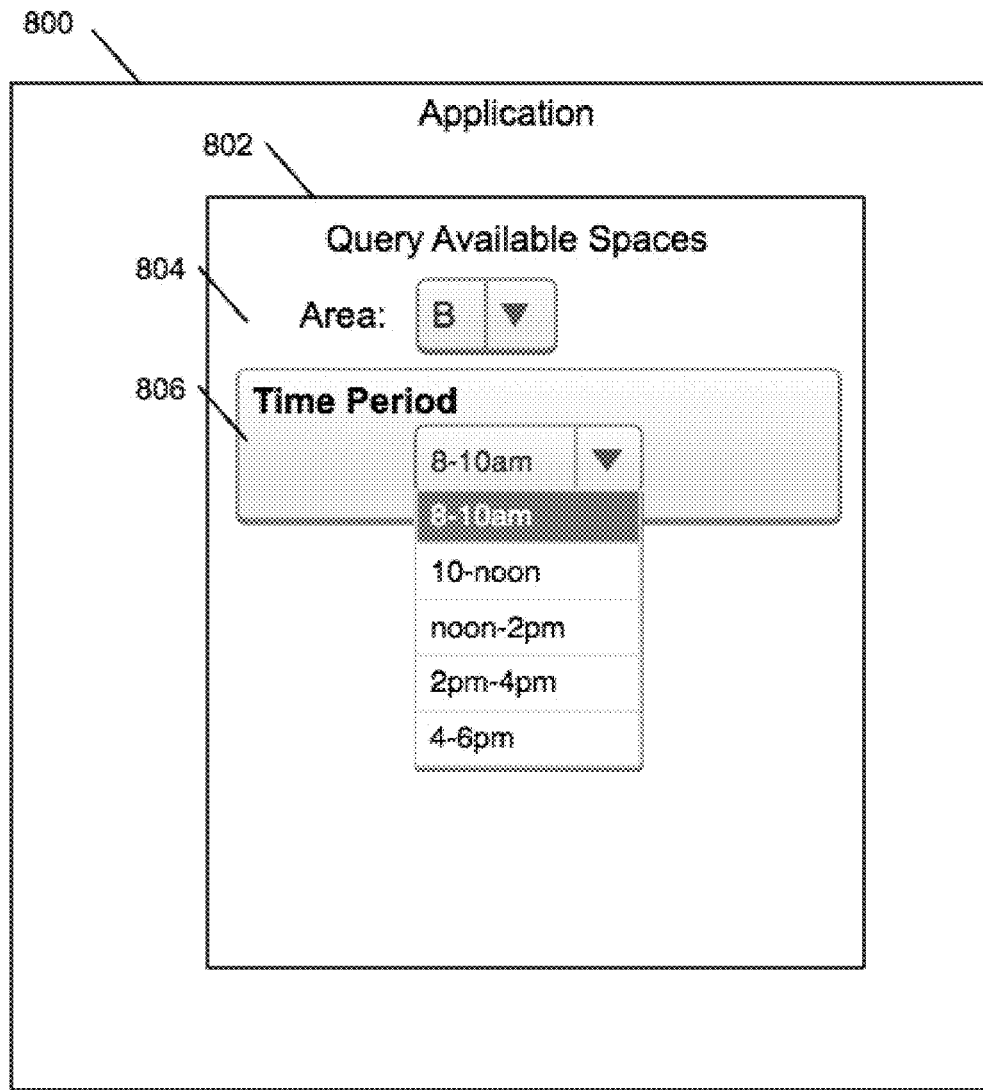
FIG. 12 illustrates a GUI for a custom user selection configuration for auditing available parking according to example embodiments.

FIG. 12 illustrates an example query operation being performed according to example embodiments. Referring to FIG. 12, in one example, the user is able to query the application 800 to specify specific audit criteria. FIG. 12 is a GUI depicting the client device 110 querying the application for available parking spaces that are normally available during a specific time period. The application displays a window, permitting the user to select the area and the time period 802. The first selection is area 804, indicating the area of the parking spaces in a dropdown component. The selection is predefined to contain a list of the names of the parking area and may include the name of the area. In the current example, the areas are named "A" and "B". A second selection is the time period desired 806. There are eight items in the dropdown component and the user is able to select the time period of interest. Upon selection of the components, the current application executing on the client device 110 sends a query message to the system 140, which queries the database 130 to query the stored data pertaining to the time of day selected in the time period component 806. A response is returned to the application executing on the client device 110 where the results are displayed in the application.

Figure 13:
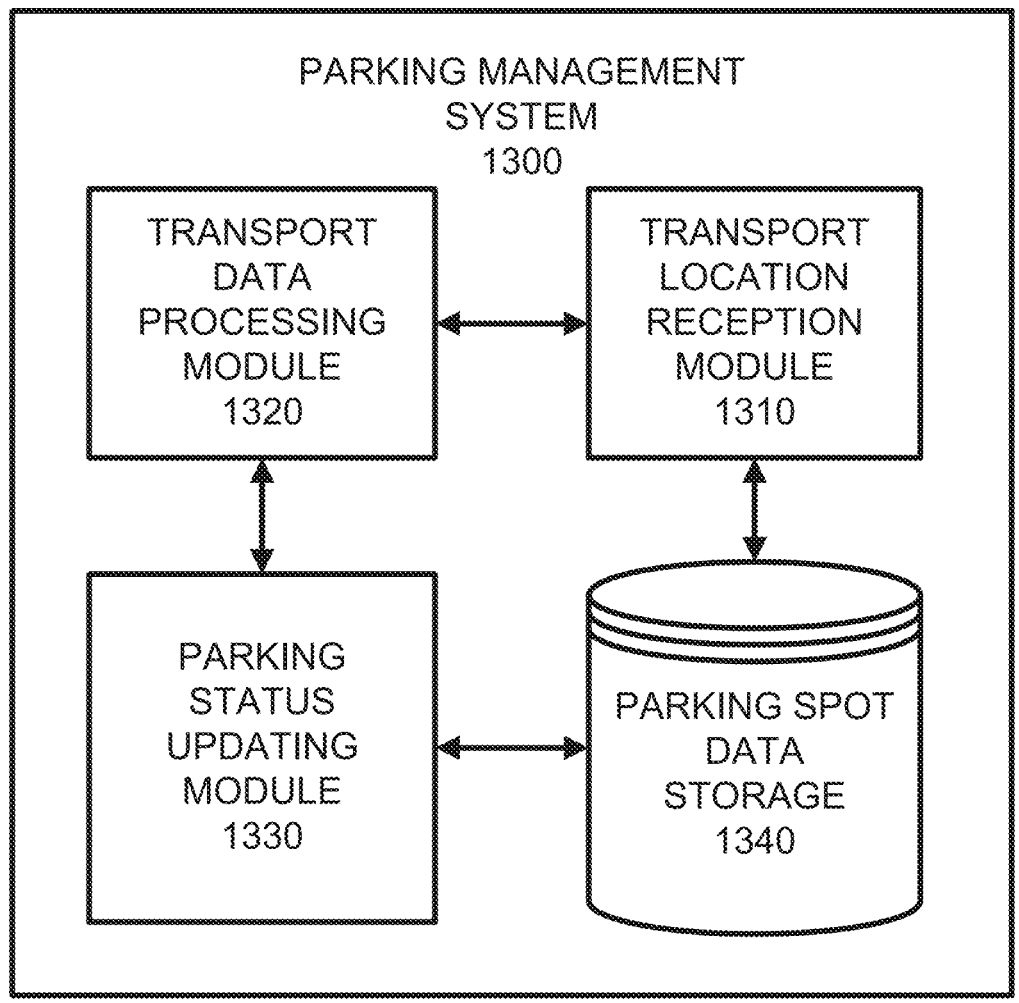
FIG. 13 illustrates a system configuration configured to perform one or more of the example embodiments of the present application.

FIG. 13 illustrates a parking management system 1300 according to example embodiments. Referring to FIG. 13, the system 1300 may represent a standalone computer, a group of computers on a network, in the cloud or in communication via any medium known to one skilled in the art which operate to perform the various operations, procedures, methods and related functions of the present application and the software application described throughout the disclosure. Referring to FIG. 13, the transport location reception module 1310 may be a transmitter/receiver that receives updates to locations and maneuvers and stores the comments in memory 1340 and forwards the comments for processing 1320. The updated content may be identified and stored in memory via the parking status update module 1330.

One example embodiment of the present application may include the system 1300 performing a parking determination procedure for updating an application which communicates with various users regarding parking. The system may perform a method that provides identifying a transport speed moving above a first threshold speed. The first threshold may indicate movement on a road or steady high speed movement not indicative of parking the transport (i.e., 20 MPH or above). The method may also include identifying a first change in direction of the transport based on information received by the input module 1310 which includes speed and location information. The processing module 1320 may then keep track of the movements and speed and locations to confirm a new transport speed after the first change in direction is less than a second threshold speed, which may be a parking speed of less than 5 MPH +/−2 MPH. The processing module 1320 may then perform initiating a monitoring event to track movement of the transport responsive to the first change in direction of the transport and the confirmed new transport speed of a lesser speed movement rate.

The same method may include monitoring location information of the transport once the first threshold speed is exceeded, and determining the transport is moving along a road responsive to identifying the transport speed is above the first threshold speed. The method also include identifying a second change in direction based on various location coordinates of the transport and designating the transport as having a parking status at an identified parking location since the speed, location on a geographical map (i.e., mall, store, movies, university, government building, etc.), type of maneuvers, etc., indicate the movements associated with parking a car. The method may also include updating a transport status in a database based on the parking status and the identified parking location. The method may also include updating a master parking status of a predefined geographical area associated with the identified parking location. The master parking status may include a parking availability map of a known geographical establishment which is shared with an application on user devices subscribed to receive such notifications. The method may also include transmitting at least one notification to at least one subscriber device based on an update to the parking availability map. Additionally, receiving location information updates and speed information updates from a mobile device operating inside the transport may be performed to further process information from the client devices to ensure reliable processing and determinations.

In another example embodiment, the system 1300 may perform tracking movements of mobile devices within a predefined geographical area and identifying a first movement of a first mobile device as being limited to a predetermined threshold distance (i.e., 15-20 feet). Then, identifying a second movement of the first mobile device as having a movement speed that is greater than a movement speed of the first movement which indicates the car is speeding up and the maneuver indicates they likely pulled out of a parking spot, and then designating the mobile device as being inside a transport leaving a parking spot which begins an operation to determine whether that spot should be included on the parking designation application map.

Additional operations include identifying the first movement of the first mobile device to include identifying a curved movement which stops and changes direction prior to the second movement. A next operation may include updating a master parking status of the predefined geographical area associated with the identified parking location to designate a parking spot availability status. The master parking status may also include a parking availability map of a known geographical establishment. Then, another operation may be transmitting at least one notification to at least one subscriber device based on an update to the parking availability map. The method may further identify the at least one subscriber device as being within a threshold distance of the parking spot (i.e., 100 yards or less, ⅛ mile or less, etc.). Instead, identifying a second transport via a camera of the first transport and identifying a turning indicator associated with the second transport may cause the cancelling of the parking spot availability status.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 14 illustrates an example network element 1400, which may represent any of the above-described network components, etc.

Figure 14:
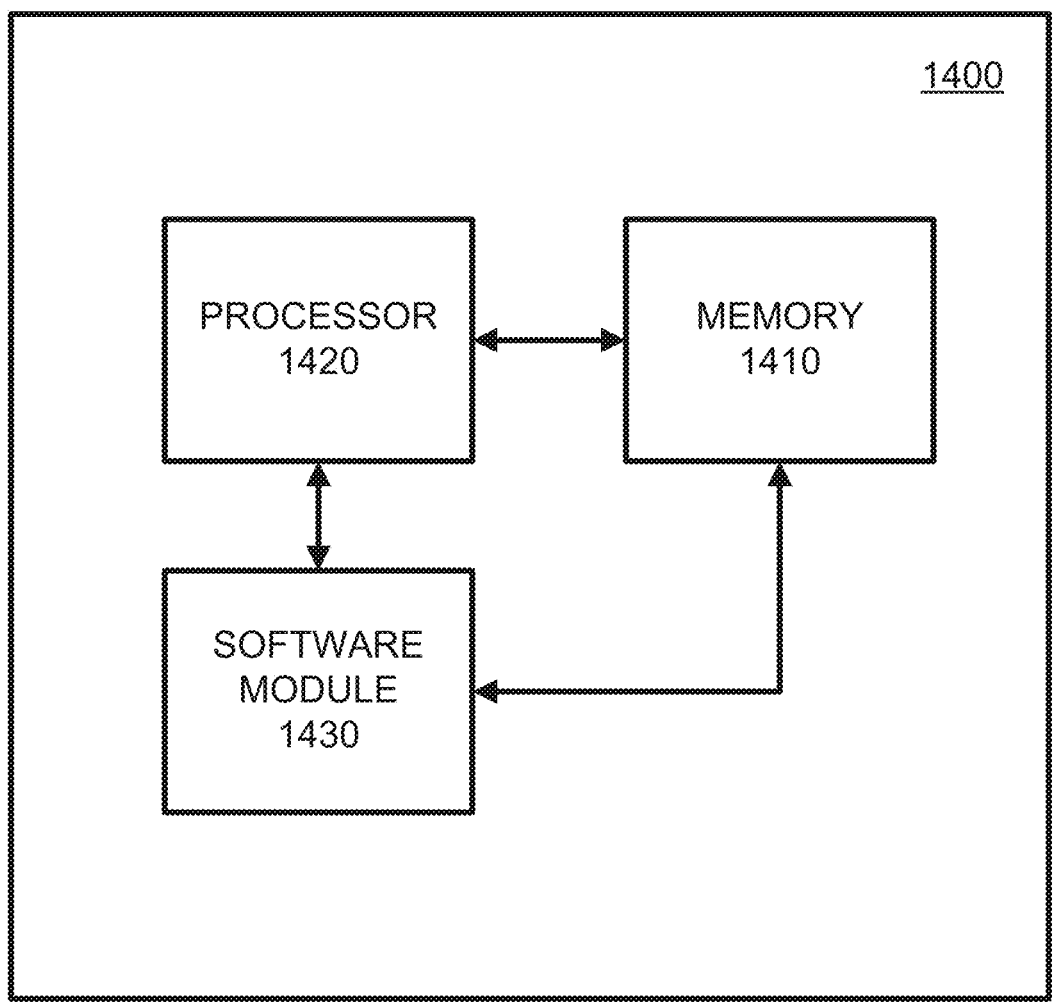
FIG. 14 illustrates an example network entity device configured to store instructions, software, and corresponding hardware for executing the same, according to example embodiments of the present application.

As illustrated in FIG. 14, a memory 1410 and a processor 1420 may be discrete components of the network entity 1400 that are used to execute an application or set of operations. The application may be coded in software in a computer language understood by the processor 1420, and stored in a computer readable medium, such as, the memory 1410. The computer readable medium may be a non-transitory computer readable medium that includes tangible hardware components in addition to software stored in memory. Furthermore, a software module 1430 may be another discrete entity that is part of the network entity 1400, and which contains software instructions that may be executed by the processor 1420. In addition to the above noted components of the network entity 1400, the network entity 1400 may also have a transmitter and receiver pair configured to receive and transmit communication signals (not shown).

Although an exemplary embodiment of the system, method, and computer readable medium of the present application has been illustrated in the accompanied drawings and described in the foregoing detailed description, it will be understood that the application is not limited to the embodiments disclosed, but is capable of numerous rearrangements, modifications, and substitutions without departing from the spirit or scope of the application as set forth and defined by the following claims. For example, the capabilities of the system of FIG. 12 can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments of the present application. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the application as discussed above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent, while remaining within the spirit and scope of the application. In order to determine the metes and bounds of the application, therefore, reference should be made to the appended claims.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
   identifying, via a mobile device disposed in a transport, a first change in direction of the transport;
   confirming, via the mobile device, a new transport speed, after the first change in direction, is less than a threshold speed;
   identifying, via the mobile device, a second change in direction of the transport;
   designating, via the mobile device, the transport as having a parking status comprising an occupied parking spot at an identified parking location; and
   updating a parking availability map in a database based on at least one of the parking status and the identified parking location.

2. The method of claim 1, comprising initiating a monitoring event to track movement of the transport responsive to the first change in direction of the transport.

3. The method of claim 1, comprising initiating a monitoring event to track movement of the transport responsive to the confirmed new transport speed.

4. The method of claim 1, further comprising updating a master parking status of a predefined geographical area associated with the identified parking location and the parking availability map.

5. The method of claim 4, wherein the master parking status comprises a parking availability map of a known geographical establishment.

6. The method of claim 5, further comprising transmitting at least one notification to at least one subscriber device based on an update to the parking availability map.

7. The method of claim 1, further comprising receiving, at a server, location information updates and speed information updates from the mobile device operating inside the transport.

8. An apparatus, comprising:
   a processor of a mobile device configured to:
   identify a first change in direction of the transport;
   confirm a new transport speed, after the first change in direction, is less than a threshold speed;
   identify a second change in direction of the transport;
   designate the transport as having a parking status comprising an occupied parking spot at an identified parking location; and
   update a parking availability map in a database based on at least one of the parking status and the identified parking location.

9. The apparatus of claim 8, wherein the processor is further configured to initiate a monitor event to track movement of the transport responsive to the first change in direction of the transport.

10. The apparatus of claim 8, wherein the processor is further configured to initiate a monitor event to track movement of the transport responsive to the confirmed new transport speed.

11. The apparatus of claim 8, wherein the processor is further configured to update a master parking status of a predefined geographical area associated with the identified parking location and the parking availability map.

12. The apparatus of claim 11, wherein the master parking status comprises a parking availability map of a known geographical establishment.

13. The apparatus of claim 12, further comprising a transmitter configured to transmit at least one notification to at least one subscriber device based on an update to the parking availability map.

14. The apparatus of claim 8, further comprising a receiver configured to receive location information updates and speed information updates from the mobile device that operates inside the transport.

15. A non-transitory computer readable storage medium configured to store instructions that when executed causes a processor to perform:
- identifying, via a mobile device disposed in a transport, a first change in direction of the transport;
- confirming, via the mobile device, a new transport speed, after the first change in direction, is less than a threshold speed;
- identifying, via the mobile device, a second change in direction of the transport;
- designating, via the mobile device, the transport as having a parking status comprising an occupied parking spot at an identified parking location; and
- updating a parking availability map in a database based on at least one of the parking status and the identified parking location.

16. The non-transitory computer readable storage medium of claim 15, wherein the processor is further configured to perform initiating a monitoring event to track movement of the transport responsive to the first change in direction of the transport.

17. The non-transitory computer readable storage medium of claim 15, wherein the processor is further configured to perform initiating a monitoring event to track movement of the transport responsive to the confirmed new transport speed.

18. The non-transitory computer readable storage medium of claim 15, wherein the processor is further configured to perform updating a master parking status of a predefined geographical area associated with the identified parking location and the parking availability map.

19. The non-transitory computer readable storage medium of claim 18, wherein the master parking status comprises a parking availability map of a known geographical establishment.

20. The non-transitory computer readable storage medium of claim 19, wherein the processor is further configured to perform:
- transmitting at least one notification to at least one subscriber device based on an update to the parking availability map; and
- receiving location information updates and speed information updates from the mobile device operating inside the transport.

* * * * *